United States Patent [19]

Meiller

[11] 4,183,492
[45] Jan. 15, 1980

[54] VEHICLE SEAT

[75] Inventor: Hermann Meiller, Amberg, Fed. Rep. of Germany

[73] Assignee: Willibald Grammer, Amberg, Fed. Rep. of Germany

[21] Appl. No.: 848,992

[22] Filed: Nov. 7, 1977

[30] Foreign Application Priority Data

Oct. 11, 1977 [DE] Fed. Rep. of Germany ... 7731339[U]

[51] Int. Cl.² .............................................. A47C 1/02
[52] U.S. Cl. .................................... 248/395; 297/314
[58] Field of Search .............. 248/393, 395, 371, 397, 248/398, 382–385; 297/314, 315, 313, 325–328; 296/65 R

[56] References Cited

U.S. PATENT DOCUMENTS

| 1,039,004 | 9/1912 | Young et al. | 297/314 X |
| 2,137,923 | 11/1938 | Olschlager et al. | 248/395 |
| 2,519,163 | 8/1950 | Turner | 297/314 X |
| 3,466,089 | 9/1969 | Stueckle | 297/314 |
| 3,632,076 | 1/1972 | Rogers | 248/371 |
| 3,770,236 | 11/1973 | Marsh et al. | 248/408 |
| 3,873,054 | 3/1975 | McKee et al. | 248/371 |

FOREIGN PATENT DOCUMENTS

| 807336 | 1/1952 | Fed. Rep. of Germany | 297/314 |
| 907859 | 1/1955 | Fed. Rep. of Germany | 248/395 |
| 755171 | 8/1956 | United Kingdom | 297/314 |
| 1432614 | 4/1976 | United Kingdom | 297/314 |

Primary Examiner—Lawrence J. Staab
Attorney, Agent, or Firm—Thomas R. Morrison

[57] ABSTRACT

The seating member of a vehicle seat is mechanically lockable in a selected one of at least three defined positions. In one of these positions (normal position) the seating member is substantially parallel to the ground on which the vehicle is standing or travelling. In the at least two other positions, one on each side of said normal position, the seating member is tilted about a pivotal axis parallel to the direction of vehicle travel.

4 Claims, 3 Drawing Figures

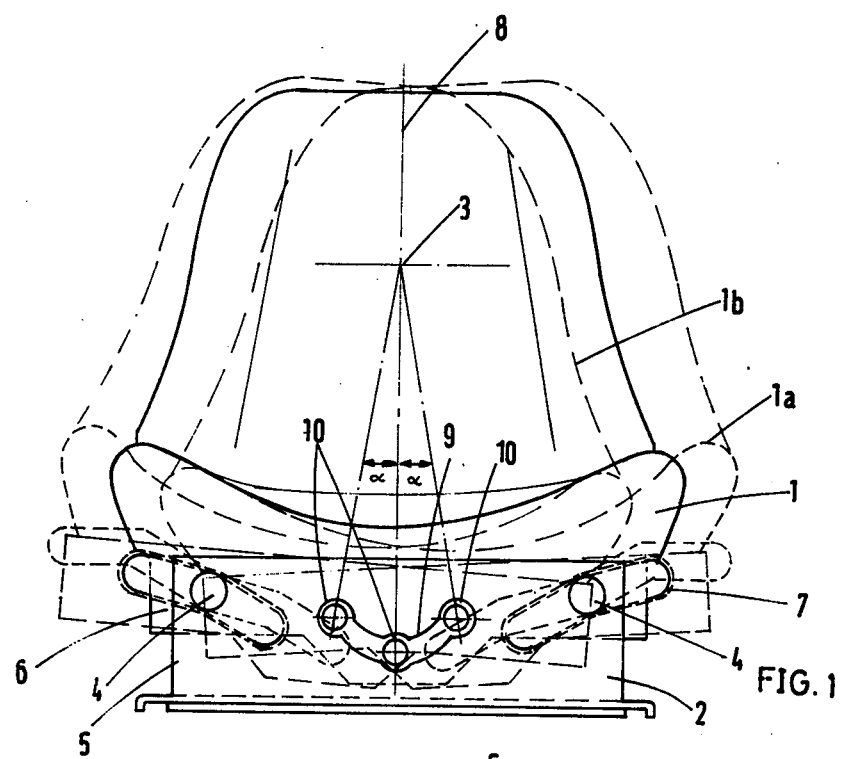
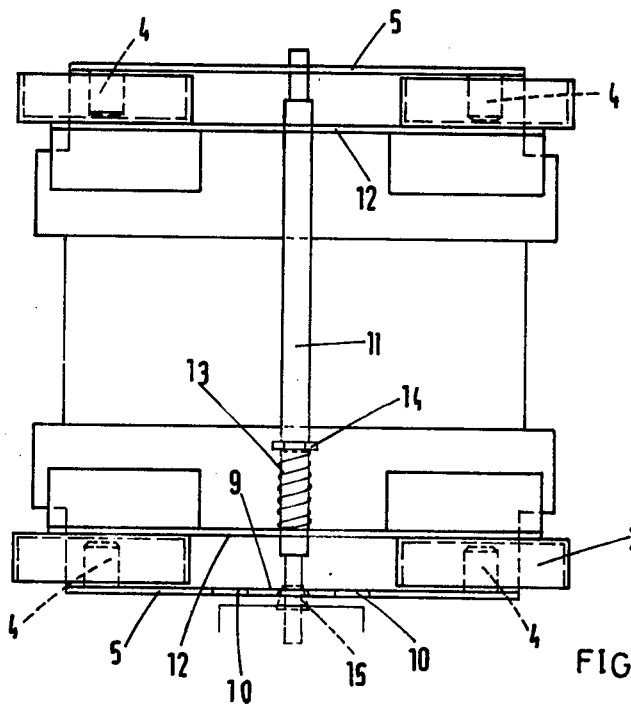

VEHICLE SEAT

The invention relates to a vehicle seat comprising a seating member tiltably mounted on a supporting bracket therefor.

Such a vehicle seat is known, for example, from U.S. Pat. No. 3,021,107. In the known seat construction, the seating member is held in the respective tilted position by a piston-cylinder unit secured to the supporting bracket and to a point on said seating member spaced from the pivotal axis thereof. A plumb bob in the form of a weight is fixed to rotate with the round control member of control means for the pressure medium of the piston-cylinder unit, a housing for said control member being secured to the seat. Flow passages for the medium in the control means are disposed so that the housing of the control member and hence the seat are, by appropriate settings of the piston-cylinder unit, always held in the same position relatively to the plumb bob, even if the supporting bracket for the seating member executes tilting motions about the vehicle axis. This ensures that the seating member is automatically retained in a horizontal position.

Such levelling of the seating member with the aid of automatic adjustment of a piston-cylinder unit is relatively expensive in construction. In addition, it has been found that it is quite unnecessary to balance out even small variations in the inclination of the seating member because these small variations are not inconvenient in practice. It has been found that an inclination of the seating member with respect to the horizontal is seriously uncomfortable only if the vehicle is disposed at a marked inclination for a prolonged period, for example in the case of tractors operated on sloping terrain or in ditches. In that case, the driver must always support himself sideways in the same direction and assume a curved posture, which is uncomfortable for prolonged periods.

It is an object of the present invention to provide a vehicle seat which is simple and economical to produce, reliable in operation and enables the effects on the driver of prolonged vehicle inclinations to be substantially compensated.

According to the invention, a vehicle seat comprises a seating member, a supporting bracket for said seating member, means mounting said seating member on said bracket for tilting motion about a pivotal axis extending parallel to the direction of vehicle travel from a normal position, at which said seating member is parallel to the ground on which the vehicle is supported, to at least two defined tilted positions, one on each side of said normal position, and mechanical means for locking said seating member to said supporting bracket.

The replacement of the substantially steplessly operative regulating chain in the vehicle seat according to U.S. Pat. No. 3,021,107 for the permanent compensation of vehicle inclinations by a simple mechanical lock for predetermined tilted positions provides a considerable simplification in construction and a greater operative reliability. Slight transverse inclinations of the vehicle occurring while it is travelling on a normal straight route along a horizontal surface are deliberately not compensated in the seat according to the invention because the driver does not find these disturbing. However, when working on a slope or in a ditch, the seat can be adjusted by hand. Depending on requirements, one or more tilted positions may be provided for the seating member so as to compensate various inclinations that the vehicle is likely to experience in use.

In many cases it will be sufficient if provision is made for two lockable tilted positions of the seating member, each at about 7° from the normal horizontal position. However, where necessary a plurality of lockable tilted positions may be provided at any desired angular increments.

If the tilted positions of the seating member are symmetrical with respect to said normal position, vehicle inclinations in one or the other direction can be compensated to substantially the same extent. The mounting means may comprise substantially horizontal journals engaged in respective guide tracks. The journals, which may comprise rollers, are preferably provided on the supporting bracket and the guide tracks may comprise slots provided in rails secured to the seating member. This construction will provide a stable support for the vehicle seat in every tilted position. In addition, such mounting of the seating member enables the pivotal axis to be disposed at a spacing about the seating member, for example at substantially the level of the hips or chest of the driver, so that the position of the driver with respect to the steering wheel will also remain substantially constant in the individual tilted positions of the seating member. Naturally, this possibility can be exploited regardless of the nature of the means for tilting the seating member and the means for locking it in the tilted positions but mechanical locking means employed in conjunction with journals moving in guide tracks provide a particularly simple method of displacing the pivotal axis to a position spaced above the seating member. Mechanical locking by means of a spring-biassed detent that can be released by a pivoted lever provides a simple expedient for rapidly shifting the seat from and to a tilted position.

The invention will now be described with reference to an example illustrated in the accompanying diagrammatic drawings, wherein:

FIG. 1 is a front elevation of a vehicle seat;

FIG. 2 is a plan view thereof but with the seating member omitted for clarity.

Figure 3:
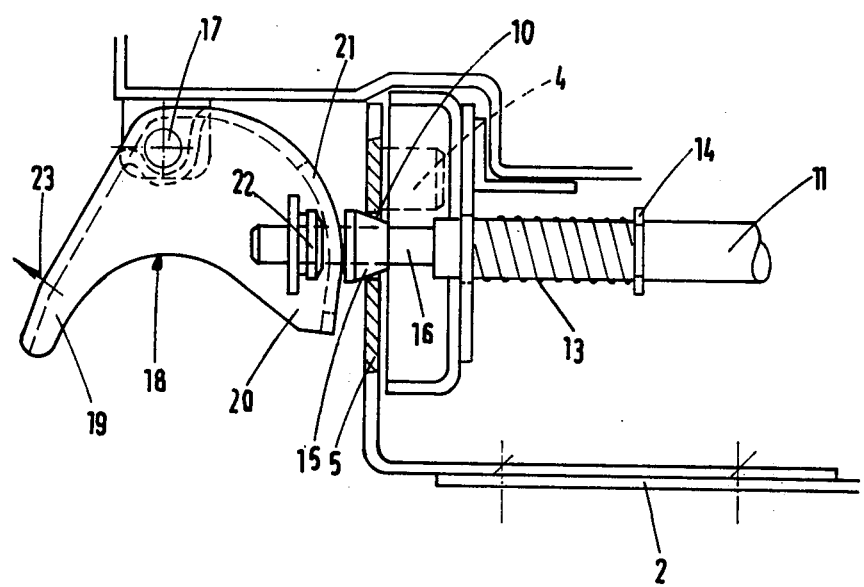
FIG. 3 is a side elevation of a detail at the front of the seat.

The seating member 1 of, say, a bucket seat for a vehicle is shown in its normal position in full lines in FIG. 1. In this normal position, the plane in which the driver is seated is substantially parallel to the surface on which the vehicle is standing or travelling. The seating member 1 can be tilted out of this normal position into either of two laterally displaced or tilted positions 1a and 1b and locked in these positions in a manner to be described hereinafter. The positions 1a and 1b are inclined relatively to the normal position by an angle α which, in the illustrated case amounts to about 7°. In these tilted positions, therefore, the seating member 1 is inclined at 7° to a supporting bracket 2 for the seating member so that corresponding inclinations of the vehicle about its longitudinal axis or direction of travel can be compensated. The pivotal axis about which the seating member 1 is tiltable is designated 3 and is disposed at a level above the seating member so that the hip or chest portions of the driver will remain at substantially the same level regardless of the inclination of the seating member. This ensures that the position of the driver will not change, or change only insignificantly with respect to the steering wheel, whereby the vehicle can be safely and comfortably controlled in every tilted position of the seating member.

The seating member 1 is mounted on the supporting bracket 2 by a cradle connection. For this purpose, pairs of inwardly directed horizontal supporting or bearing trunnions 4 are provided on the supporting bracket 2, one near each of its four corners, and these trunnions are secured to vertical rails 5 or the like of the bracket 2. The seating member 1 is provided with an angle or vertical rail 6 having arcuate guide tracks 7 in which the trunnions 4 engage. The guide tracks 7 are in the form of housinglike closed guide rails in which the trunnions 4 can slide. To reduce friction, the trunnions 4 may be in the form of rollers. In the full-line normal position of the seating member 1 in FIG. 1, the trunnions 4 are disposed in a central region of the guide tracks 7 whereas in the two tilted positions one of the trunnions 4 is disposed near the inner end of the adjacent guide track 7 and the other trunnion 4 is disposed near the outer end of its associated guide track 7. The guide tracks 7 are symmetrically disposed with respect to the vertical medial axis 8 of the seat and are inclined upwardly and outwardly. By making the guide tracks 7 upwardly convex as illustrated, the seating member 1 is returned to the normal position from one of the tilted positions under gravity effect. In addition, the illustrated formation of the guide tracks 7 enables the desired elevated position of the pivotal axis 3 to be obtained.

To lock the seating member in the normal position and in either of the positions where it is tilted by the angle α, the vertical rail 5 of the supporting bracket 2 carrying the trunnions 4 is provided with a guide slot 9 having enlarged locking recesses 10. The guide slot 9 is arcuately curved so that a rod 11 which is secured to the seating member and which passes through the central locking recess 10 associated with the normal position will, when the seating member is tilted, move along the guide slot 9 and reach one of the outer locking recesses 10. The rod 11 constitutes a detent. As will be evident from FIG. 2, the rod passes through front and rear rails 12 secured to the underside of the seating member 1 and is axially displaceable in the rails 12. The rod 11 is biassed by a spring 13 to a locking position. In the illustrated example, the spring 13 is a compression spring supported between the front rail 12 and an abutment collar 14 of the rod 11.

As will be evident particularly from FIG. 3, the rod 11 is provided with a locking enlargement or head 15 which may be frustoconically tapered and adjoins a section 16 of the rod which is narrower than the width of the guide slot 9, whereas the head 15 is wider than the slot portions between the recesses 10 and the largest diameter of the head is also wider than the recesses 10.

A bell crank lever 18 pivotable about an axis 17 is mounted at the underside of the seating member 1. It comprises a handle portion 19 which can be operated by the driver and is accessible from the front of the seat and an actuating portion 20 which is provided with a cam guide 21 parallel to the pivotal axis 17. The cam guide 21 engages behind a suitable support 22 near the front of the rod 11.

FIG. 3 shows a locked position in which the head 15 of the rod 11 is disposed in one of the locking recesses 10. The spring 13 urges the smaller diameter portion of the head 15 into the recess 10, whereby the rod is locked in position and the seating member cannot be displaced. To unlock the seating member, the bell crank lever 18 is pulled by its handle portion 19 in the direction of the arrow 23 in FIG. 3, whereby the lever 18 is pivoted about the axis 17 and the cam guide 21 acts on the support 22 in such a way that the rod 11 is axially displaced to the left-hand side in FIG. 3 against the action of the spring 13. This causes the narrower section 16 of the rod 11 to move into the plane of the rail 5 having the guide slot 9 and locking recesses 10, whereby the rod 11 is free to move along the slot 9 from one recess 10 to another, the tilt of the seating member 1 changing correspondingly. When the lever 18 is released again, the spring 13 will urge the head 15 into the appropriate locking recess 10 so as to lock the seating member in position.

I claim:

1. A vehicle seat comprising a seating member, tilting means on said seating member for performing a tilting motion about a pivotal axis extending parallel to the direction of vehicle travel, said pivotal axis being spaced above said seating member, said tilting means being supporting brackets having at least two guide tracks symmetrically disposed in relation to a vertical medial line of the seat, each of said guide tracks being inclined upward and outward toward opposite sides of said seating member and being substantially upwardly convex, and at least two horizontal journals attached to said vehicle engaged in respective guide tracks.

2. The seat defined in claim 1, wherein said journals comprise rollers.

3. The seat defined in claim 1, wherein said journals are provided on said supporting bracket and said guide tracks comprise slots provided in rails secured to said seating member.

4. The seat defined in claim 3, wherein said slots are closed at their ends.

* * * * *